United States Patent
Keränen et al.

(10) Patent No.: US 12,500,960 B2
(45) Date of Patent: Dec. 16, 2025

(54) COMPUTING DEVICE, NETWORK NODE, AND METHODS THEREOF

(71) Applicant: Telefonaktiebolaget LM Ericsson (PUBL), Stockholm (SE)

(72) Inventors: Ari Keränen, Helsinki (FI); Jari Arkko, Kauniainen (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 244 days.

(21) Appl. No.: 18/007,123

(22) PCT Filed: Jul. 29, 2020

(86) PCT No.: PCT/EP2020/071336
§ 371 (c)(1),
(2) Date: Jan. 27, 2023

(87) PCT Pub. No.: WO2022/022815
PCT Pub. Date: Feb. 3, 2022

(65) Prior Publication Data
US 2023/0231925 A1  Jul. 20, 2023

(51) Int. Cl.
*H04L 67/51* (2022.01)

(52) U.S. Cl.
CPC ................ *H04L 67/51* (2022.05)

(58) Field of Classification Search
CPC .................................................. H04L 67/51
See application file for complete search history.

(56) References Cited

U.S. PATENT DOCUMENTS

| 8,141,373 B2 * | 3/2012 | Peterson | F24F 11/70 |
| | | | 62/158 |
| 2015/0281872 A1 * | 10/2015 | Pierrel | H04L 67/12 |
| | | | 702/188 |

(Continued)

FOREIGN PATENT DOCUMENTS

| WO | 2015 187068 A1 | 12/2015 |
| WO | 2016 014642 A1 | 1/2016 |

OTHER PUBLICATIONS

EPO Communication pursuant to Article 94(3) EPC issued for Application No. 20 747 408.1-1213—Feb. 13, 2024.

(Continued)

*Primary Examiner* — Kostas J Katsikis
(74) *Attorney, Agent, or Firm* — Baker Botts L.L.P.

(57) ABSTRACT

A computing device is disclosed. The computing device comprises processing circuitry that is configured to expose (110) a resource that is hosted at the computing device, wherein the resource comprises a digital interface for a physical entity to which the resource corresponds, and expose (120) information about a relation between a state of the resource and a state of the physical entity to which the resource corresponds. Also disclosed is a network node, the network node comprising processing circuitry that is configured to discover a resource that is hosted at the computing device, and to discover information about a relation between a state of the resource and a state of the physical entity to which the resource corresponds. The processing circuitry is further configured to prepare an action relating to the physical entity corresponding to the resource on the basis of a current state of the resource and the information, and to initiate execution of the prepared action.

11 Claims, 9 Drawing Sheets

(56) References Cited

U.S. PATENT DOCUMENTS

2016/0291587 A1* 10/2016 Vandikas ............ G05B 23/0289
2017/0208139 A1* 7/2017 Li ........................ H04L 67/51
2020/0092908 A1* 3/2020 Li ........................ H04L 41/08
2020/0284457 A1* 9/2020 Sinha .................... F24F 11/63
2021/0400689 A1* 12/2021 Wang ................... H04W 76/14

OTHER PUBLICATIONS

EPO Communication Pursuant To Article 94(3) EPC issued for Application No. 20 747 408.1-1213—Aug. 11, 2023.
EPO Communication Pursuant To Article 94(3) EPC issued for Application No. 20 747 408.1-1206—Aug. 9, 2024.
3GPP TS 23.682 V16.2.0 (Mar. 2019); 3rd Generation Partnership Project; Technical Specification Group Services and System Aspects; Architecture enhancements to facilitate communications with packet data networks and applications (Release 16).
Lightweight Machine to Machine Technical Specification: Core; Approved Version 1.1.1—Jun. 17, 2019, Open Mobile Alliance; omaSpecWorks.
Z. Shelby, Sensinode, Aug. 2012; Constrained RESTful Environments (CoRE) Link Format; Internet Engineering Task Force (IETF); ISSN: 2070-1721.
PCT International Search Report issued for International application No. PCT/EP2020/071336—Mar. 3, 2021.
PCT Written Opinion of the International Searching Authority issued for International application No. PCT/EP2020/071336—Mar. 3, 2021.
Official Action issued by the Government of India/Intellectual Property India for Application No. 202317013217—Jul. 7, 2025.

* cited by examiner

COMPUTING DEVICE, NETWORK NODE, AND METHODS THEREOF

PRIORITY

This nonprovisional application is a U.S. National Stage Filing under 35 U.S.C. § 371 of International Patent Application Serial No. PCT/EP2020/071336 filed Jul. 29, 2020 and entitled "COMPUTING DEVICE, NETWORK NODE, AND METHODS THEREOF" which is hereby incorporated by reference in its entirety.

TECHNICAL FIELD

The present disclosure relates to a computing device, a network node, to methods performed by a computing device and a network node, and to corresponding computer programs and computer program products.

BACKGROUND

The "Internet of Things" (IoT) refers to devices enabled for communication network connectivity, so that these devices may be remotely managed, and data collected or required by the devices may be exchanged between individual devices and between devices and application servers. Such devices, examples of which may include sensors and actuators, are often, although not necessarily, subject to severe limitations on processing power, storage capacity, energy supply, device complexity and/or network connectivity, imposed by their operating environment or situation, and may consequently be referred to as constrained devices. Constrained devices may operate according to a range of protocols, including widely used protocols such as Internet Protocol (IP) v4 or IPv6, and dedicated protocols for constrained devices.

The Constrained Application Protocol (CoAP) is a RESTful IoT protocol suitable for constrained nodes and networks. The Constrained RESTful Environments (CoRE) link format, specified in RFC 6690, can be used to describe information about resources a CoAP device is hosting. The format consists of links (URLs or URL paths) that represent the resources, and associated link attributes.

OMA SpecWorks Lightweight Machine to Machine (LwM2M) is a device management and service enablement protocol based on CoAP. LwM2M devices are often battery-operated and hence usually sleep for extended periods of time and use constrained networks for communication. LwM2M uses an object model to represent capabilities of managed devices. Each capability is encapsulated in an Object that consists of multiple Resources. A resource specifies a particular view or active property of an object, and each resource can be readable, writeable, and/or executable. For example, a temperature sensor object might expose multiple resources including current value (most recent reading), minimum and maximum possible values, minimum and maximum values over a time interval, etc.

The concept of a Digital Twin is becoming a popular solution to represent and use IoT systems. In the context of the present disclosure, a digital twin comprises a digital representation of a physical object or system, the digital representation reflecting in the digital domain the physical, or "real world" state of the object or system it represents. The digital twin may for example be running in the cloud, and may be configured with information about the object or system, one or more processes for monitoring the object or system, analysing object or system performance etc. In order for a digital twin to operate efficiently, it should be maintained in close synchronization with the physical object it represents, so requiring reliable sensing and actuating capabilities, in order to reflect and change the state of the object, and efficient communication. For IoT devices that may spend a significant period of time sleeping, as well as being subject to communication delays associated with constrained networks, the challenges of ensuring accurate synchronisation between the physical state of an object and its digital representation can be particularly acute.

SUMMARY

It is an aim of the present disclosure to provide nodes, methods and a computer readable medium which at least partially address one or more of the challenges discussed above.

According to a first aspect of the present disclosure, there is provided a computing device comprising processing circuitry that is configured to expose a resource that is hosted at the computing device, wherein the resource comprises a digital interface for a physical entity to which the resource corresponds, and to expose information about a relation between a state of the resource and a state of the physical entity to which the resource corresponds.

According to another aspect of the present disclosure, there is provided a network node comprising processing circuitry that is configured to discover a resource that is hosted at the computing device, wherein the resource comprises a digital interface for a physical entity to which the resource corresponds, and to discover information about a relation between a state of the resource and a state of the physical entity to which the resource corresponds. The processing circuitry is further configured to prepare an action relating to the physical entity corresponding to the resource on the basis of a current state of the resource and the information, and to initiate execution of the prepared action.

According to another aspect of the present disclosure, there is provided a method performed by a computing device, the method comprising exposing a resource that is hosted at the computing device, wherein the resource comprises a digital interface for a physical entity to which the resource corresponds, and exposing information about a relation between a state of the resource and a state of the physical entity to which the resource corresponds.

According to another aspect of the present disclosure, there is provided a method performed by a network node, the method comprising discovering a resource that is hosted at the computing device, wherein the resource comprises a digital interface for a physical entity to which the resource corresponds, and discovering information about a relation between a state of the resource and a state of the physical entity to which the resource corresponds. The method further comprises preparing an action relating to the physical entity corresponding to the resource on the basis of a current state of the resource and the information and initiating execution of the prepared action.

According to another aspect of the present disclosure, there is provided a computer program comprising instructions which, when executed on at least one processor, cause the at least one processor to carry out a method according to any one of the aspects or examples of the present disclosure.

According to another aspect of the present disclosure, there is provided a carrier containing a computer program according to the preceding aspect of the present disclosure, wherein the carrier comprises one of an electronic signal, optical signal, radio signal or computer readable storage medium.

According to another aspect of the present disclosure, there is provided a computer program product comprising non transitory computer readable media having stored thereon a computer program according to a preceding aspect of the present disclosure.

BRIEF DESCRIPTION OF THE DRAWINGS

For a better understanding of the present disclosure, and to show more clearly how it may be carried into effect, reference will now be made, by way of example, to the following drawings in which.

DETAILED DESCRIPTION

Figure 1:
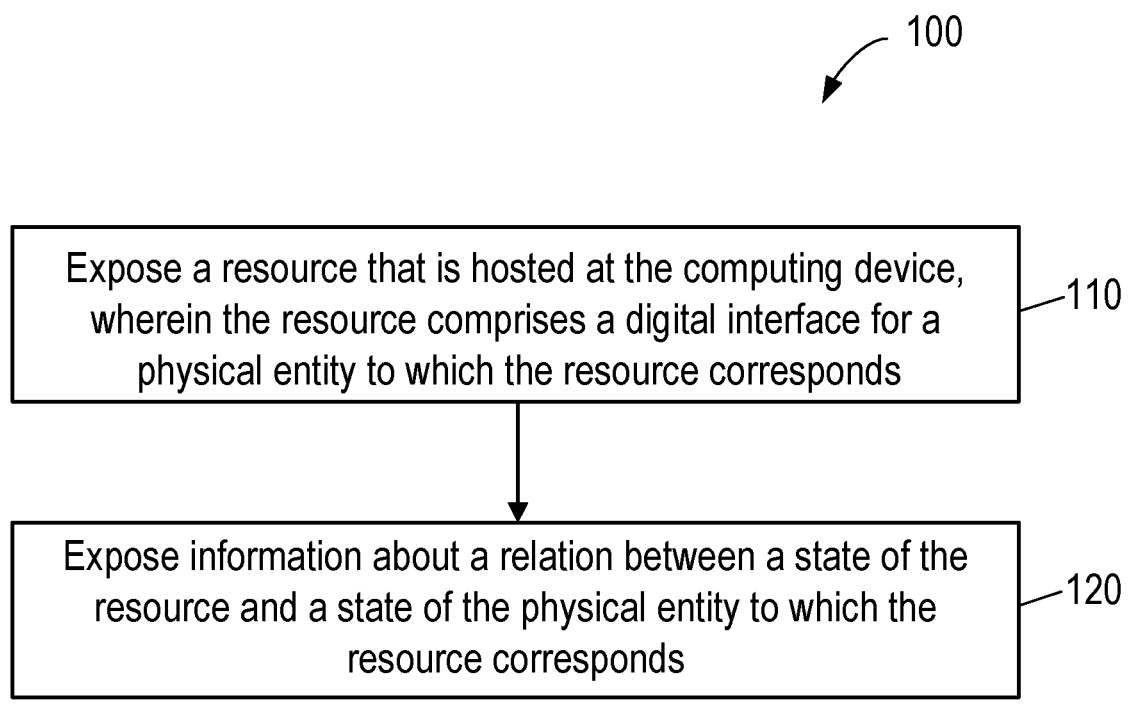
FIG. 1 is a flow chart illustrating process steps in a method performed by a computing device.

As noted above, Digital Twins for IoT devices can be particularly challenging to implement. IoT devices, which are often managed using LwM2M, frequently spend significant periods of time in a sleeping state, meaning the Digital Twin cannot accurately reflect in real time the state of the sleeping device. Proxy servers or aggregation functionality may address some of the issues arising from long sleep periods, providing cached information and aggregating commands received during sleep cycles so as to avoid unnecessary actions for the device on waking. However, the proxy server or aggregation function must be programmed with the relevant knowledge of device sleep cycle, and this still does not address the lack of knowledge at the application about the extent to which the cached information reflects the current physical state of the device, or when commands cached at the proxy may be delivered to the device. In addition, changing the state of an entity in the physical world often takes a non-negligible amount of time, in contrast to a state change in the digital domain. It would be beneficial for a Digital Twin system to be aware of these transition periods, and sleep cycles, in order to be able to reflect the state of the underlying physical system accurately. Such awareness would enable the Digital Twin system to time its actuator commands more effectively, detect possible fault conditions, and make more accurate predictions in simulations of the physical system. Information about transition periods, sleep cycles, and other relations between a physical entity and its digital representation or management will generally be specific to a particular IoT device. However, in many IoT systems, the set of usable sensors and actuators is not predetermined. In addition, very few device manufacturers publish information of this type for their devices, and the rare information that is available is not easily locatable or accessible by Digital Twin or other applications for which the information would be useful.

Aspects of the present disclosure propose that computing devices, which may for example be IoT devices, may publish extended information about themselves, beyond what is already provided by the devices when they register themselves, for example in local resource directories. This information may for example be presented as annotations, as metadata, as link attributes, as resources, etc., and may reflect how physical, real world processes are impacted by actuators or followed by sensors. This publishing of this information enables IoT applications, including for example Digital Twin processes, to discover the information without needing the information to be built in, or to be programmed with instructions for where to find the information. The information can enable the IoT applications to improve their operation in a number of different ways for different types of device.

Example methods and devices according to the present disclosure may be implemented in multiple different settings, and with respect to a range of existing standards and protocols. The present disclosure provides three examples for implementation of the processes and apparatus proposed herein, including: Lightweight Machine-to-Machine (LwM2M), Constrained Application Protocol (CoAP) Resource Directories (RDs), and Open Connectivity Foundation (OCF) data models.

Considering for example LwM2M, the present disclosure proposes a way to extend the LwM2M object model so that a LwM2M client can keep a cloud endpoint well synchronised, so as to be able to represent the LwM2M client as a Digital Twin. This may be enabled by annotating descriptions of resources to keep track of how changes in the given resource impact the physical world. This allows the cloud endpoint to reflect the current state of changes in the physical world, for example for changes that cannot be executed immediately, or for changes that take a non-negligible amount of time to execute.

An example of an annotation about impact in the physical world could be indicating that a change in a given valve setting will not take effect until the next wake-up period of the valve device happens, and that the physical process takes a given amount of time to complete once initiated. An example of an annotation about current state of a change could be that the valve is in the process of moving from 0% to 100% open, is currently 30% open, and will need another two seconds to finish the current movement.

FIG. 1 is a flow chart illustrating process steps in a method 100 performed by a computing device. The computing device may be operable to run at least one of a Constrained Application Protocol (CoAP) server and/or a Lightweight Machine to Machine (LwM2M) client, and may comprise an IoT device, which may be a constrained device.

Referring to FIG. 1, the method 100 first comprises, in step 110, exposing a resource that is hosted at the computing device, wherein the resource comprises a digital interface for a physical entity to which the resource corresponds. In step 120, the method 100 comprises exposing information about a relation between a state of the resource and a state of the physical entity to which the resource corresponds. As discussed in further detail below with reference to FIG. 3, the information about a relation between a state of the resource and a state of the physical entity to which the resource corresponds may take a variety of different forms. For example, the information may comprise a time required for the physical entity to complete a state change, and consequently a delay between a change of state in the resource and the completion of the equivalent change of state in the physical entity. Other examples of information that may be exposed in step 120 of the method 100 are discussed in greater detail below.

Figure 2:
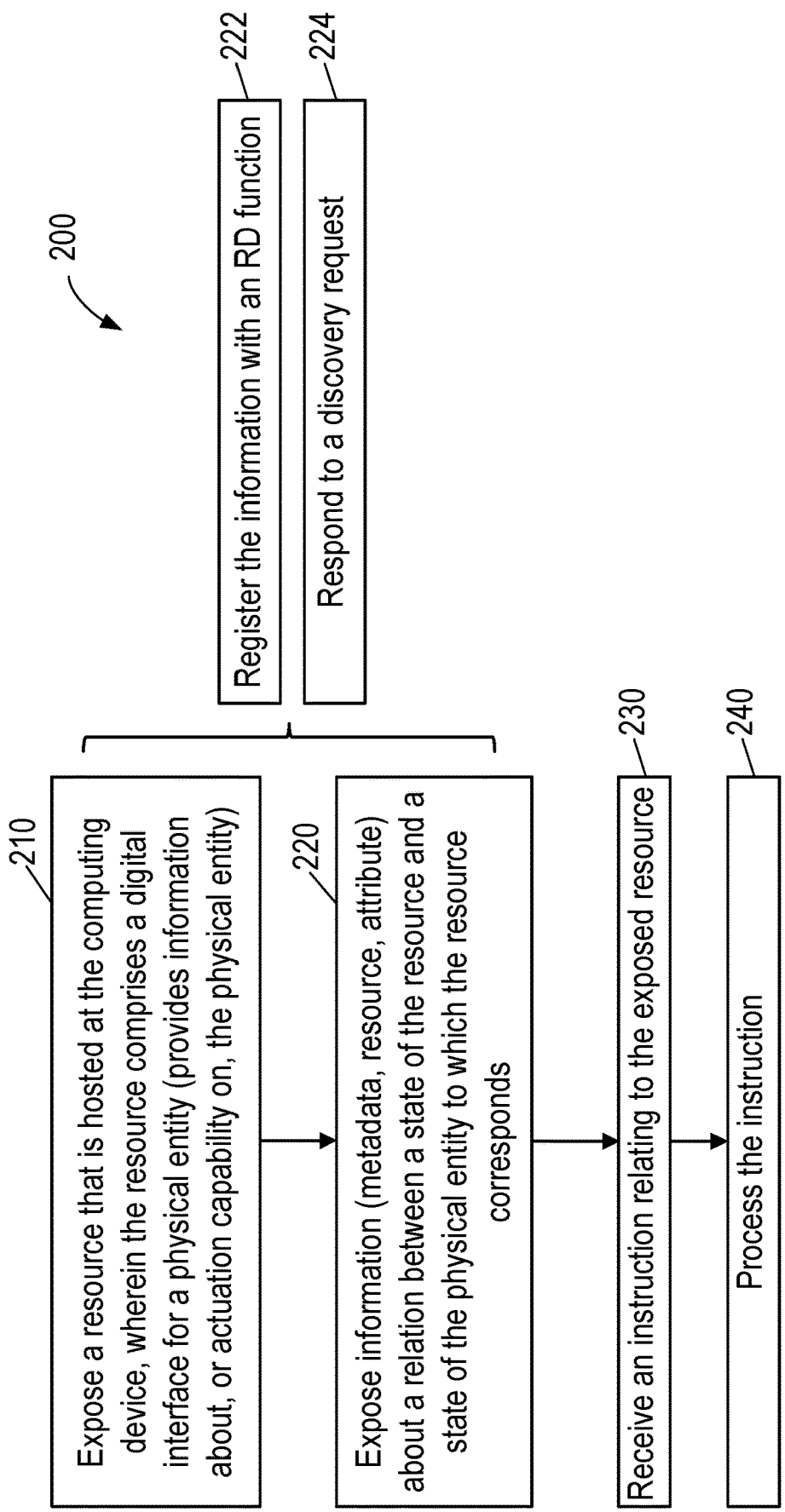
FIG. 2 is a flow chart illustrating process steps in another example of a method performed by a computing device.

FIG. 2 is a flow chart illustrating process steps in a further example of method 200 performed by a computing device. The computing device may be operable to run at least one of a Constrained Application Protocol (CoAP) server and/or a Lightweight Machine to Machine (LwM2M) client, and may comprise an IoT device, which may be a constrained device.

The steps of the method 200 illustrate one example way in which the steps of the method 100 may be implemented and supplemented in order to achieve the above discussed and additional functionality.

Referring to FIG. 2, according to the method 200, in a first step 210, the computing device exposes a resource that is hosted at the computing device, wherein the resource comprises a digital interface for a physical entity to which the resource corresponds. The resource may for example comprise a digital interface that provides information about, or actuation capability on, the physical entity. In some examples, the resource may comprise a software element and/or logical functionality for accessing, processing and storing sensor information and for controlling actuators. In step 220, the computing device exposes information about a relation between a state of the resource and a state of the physical entity to which the resource corresponds. This information may be exposed as any one or more of a metadata resource, a resource attribute, and/or an annotation to the resource. A metadata resource may for example comprise a separate resource that contains only the information, and which is linked in some way to the resource that is the subject of the information.

As illustrated in steps 222 and 224, exposing the resource and the information about a relation between a state of the resource and a state of the physical entity to which the resource corresponds may comprise performing at least one of registering the information with a Resource Directory function, or responding to a discovery request. The discovery request may for example be addressed to a suitable multicast address to which the device is listening. The response to the discovery request may include both resources exposed by the computing device and the relevant information about a relation between the resource or resources and a state of the physical entity to which the resource or resources correspond.

In step 230, the computing device may receive an instruction relating to the exposed resource, and in, in step 240, the computing device may process the instruction. Processing the instruction may comprise carrying out the instruction, if possible, and/or positively or negatively acknowledging the instruction. For example if the instruction cannot immediately be carried out, is not recognised, or cannot be carried out at all.

Figure 3:
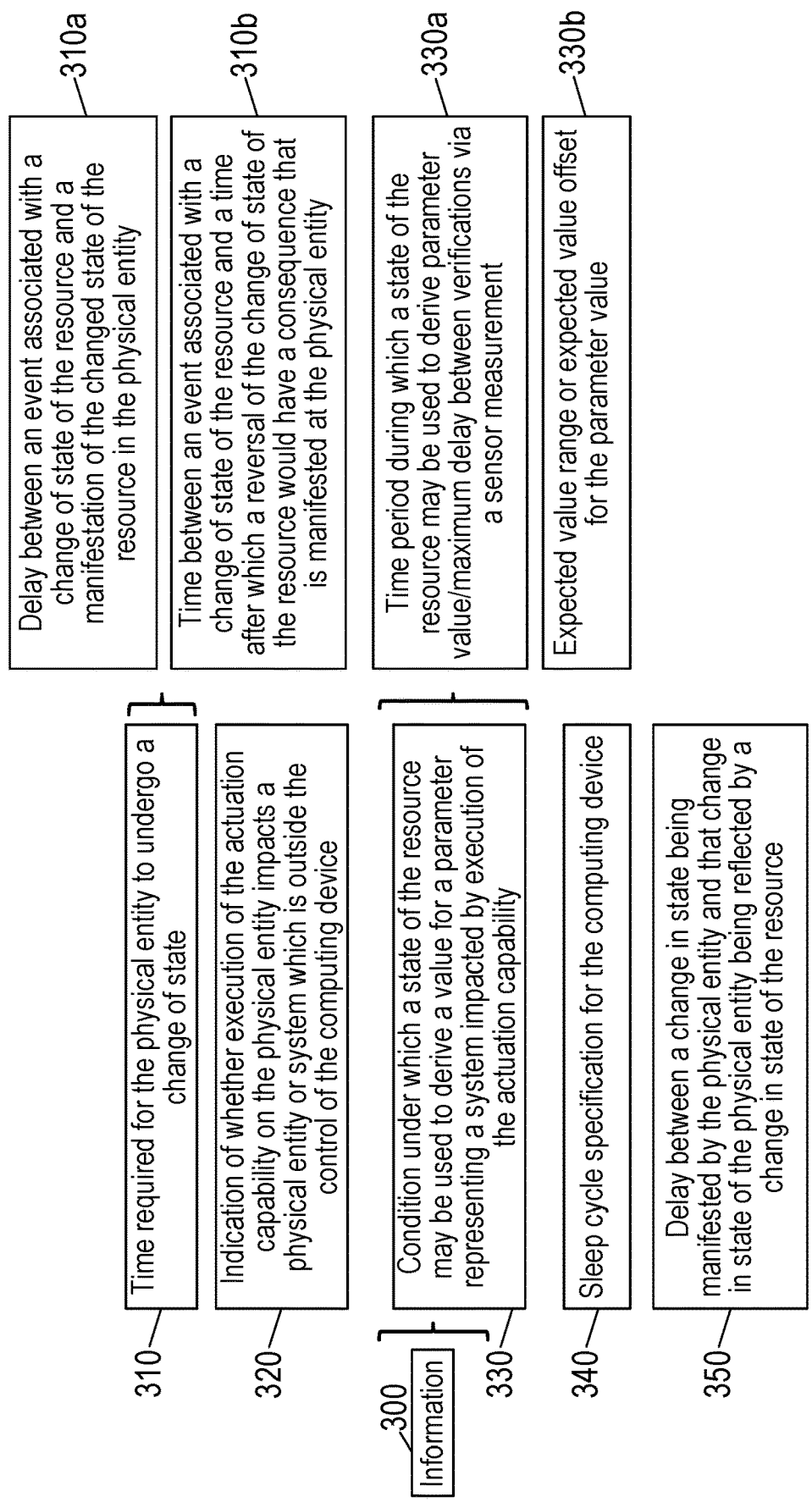
FIG. 3 illustrates examples of information that may be exposed by a computing device according to the methods of FIGS. 1 and 2, or discovered by a network node according to the methods of FIGS. 4 and 5.

FIG. 3 illustrates a range of options for information 300 about a relation between a state of an exposed resource and a state of the physical entity to which the exposed resource corresponds, which information may be exposed in step 120 of the method 100 and/or step 220 of the method 200.

In a first example, illustrated at 310, the information may comprise a time required for the physical entity to undergo a change of state. This information may therefore convey a delay between a change of state of the resource (such as an actuation instruction) and a change of state of the physical entity to which it corresponds (such as completing the instructed actuation). In further examples, this information may convey a delay between a change of state of the physical entity (such as a change in temperature of an object or substance), and a change in state of the corresponding resource (such as a sensor reading approaching the changed temperature).

As illustrated at 310a, for a resource that comprises a digital interface that provides actuation capability on the physical entity, the information about a relation between a state of the resource and a state of the physical entity to which the resource corresponds may comprise a delay between an event associated with a change of state of the resource and a manifestation of the changed state of the resource in the physical entity. The event associated with a change of state of the resource may comprise receipt of an instruction to change the resource state, updating of the resource state to match the instruction etc. The manifestation may be defined as a condition associated with execution of the actuation controlled by the resource, and may be defined by the actuation itself (e.g. % opening of a valve) or a measured impact of the actuation (e.g. pressure or flow rate in or adjacent the value).

According to different examples of the present disclosure, the manifestation of the changed state of the resource in the physical entity may comprise any one or more of:
 a change in state of the physical entity that is detectable by an instrument;
 a change in state of the physical entity that is detectable by a human observer;
 a value of a parameter reflecting a state of the physical entity reaching a threshold value;
 a change in state of the physical entity that impacts another physical entity or system;
 a value of a parameter reflecting a state of another physical entity or system reaching a threshold value; and/or
 completion of a process initiated or impacted by the physical entity.

As illustrated at 310b, the delay between an event associated with a change of state of the resource and a manifestation of the changed state of the resource in the physical entity may comprise a time between the event associated with a change of state of the resource and a time after which a reversal of the change of state of the resource would have a consequence that is manifested at the physical entity. A consequence that is manifested at the physical entity may be defined using any of the options set out above. For example, the consequence may be an effect that is detectable to a human observer, or may be an effect that is purely mechanical, chemical etc., such as reaching certain point in an engine start process, or in a chemical reaction.

A further example of information is illustrated at 320. For a resource that comprises a digital interface that provides actuation capability on the physical entity, the information about a relation between a state of the resource and a state of the physical entity to which the resource corresponds may comprise an indication of whether execution of the actuation capability on the physical entity impacts a physical entity or system which is outside the control of the computing device.

A further example of information is illustrated at 330. For a resource that comprises a digital interface that provides actuation capability on the physical entity, the information about a relation between a state of the resource and a state of the physical entity to which the resource corresponds may comprise a condition under which a state of the resource may be used to derive a value for a parameter representing a system impacted by execution of the actuation capability. As illustrated at 330a, the condition may comprise a time period during which a state of the resource may be used to derive a value for a parameter representing a system impacted by execution of the actuation capability. In one example, the time period may define a maximum delay between verifications of the parameter value via a sensor measurement. As illustrated at 330b, the condition may comprise at least one of an expected value range or an expected value offset for the parameter value. In such examples, a derived value that is outside the expected range or offset may be verified via a sensor reading.

A further example of information is illustrated at 340, according to which the information about a relation between a state of the resource and a state of the physical entity to which the resource corresponds may comprise a sleep cycle specification for the computing device. The sleep cycle specification may provide, for actuators, a communication delay at any given time between instructing a state change of a resource and the state change being activated in the resource, and, for sensors, a synchronisation delay, for example if sensor values are provided via a proxy based on values from the last awake period during device sleeping periods.

A further example of information is illustrated at 350. For a resource that comprises a digital interface that provides information about the physical entity, the information about a relation between a state of the resource and a state of the physical entity to which the resource corresponds may comprise a delay between a change in state being manifested by the physical entity and that change in state of the physical entity being reflected by a change in state of the resource. For example, a sensor may take time to register a change in the parameter it is measuring, or sampling frequency may impose a delay between a change of state being manifested in an environment and that change being reflected in the sensor at the next sampling interval. The manifestation of the changed state of the physical entity may comprise any one or more of the changes discussed above with reference to 310a.

Any of the above discussed information examples that contain time periods or delays may also or alternatively be conveyed as time ranges, for example to take account of communication delays owing to sleep cycles or other communication delays that may be encountered in constrained networks. The original time value may become the lowest value of the time range, with the highest value of the range representing the maximum expected communication delay.

The information exposed at step 120 and/or 220 may comprise any one or more items of information, drawn from any one or more of the examples discussed above and/or illustrated in FIG. 3. The separate items of information may in some examples include human readable semantics associated with the or each item.

Figure 4:
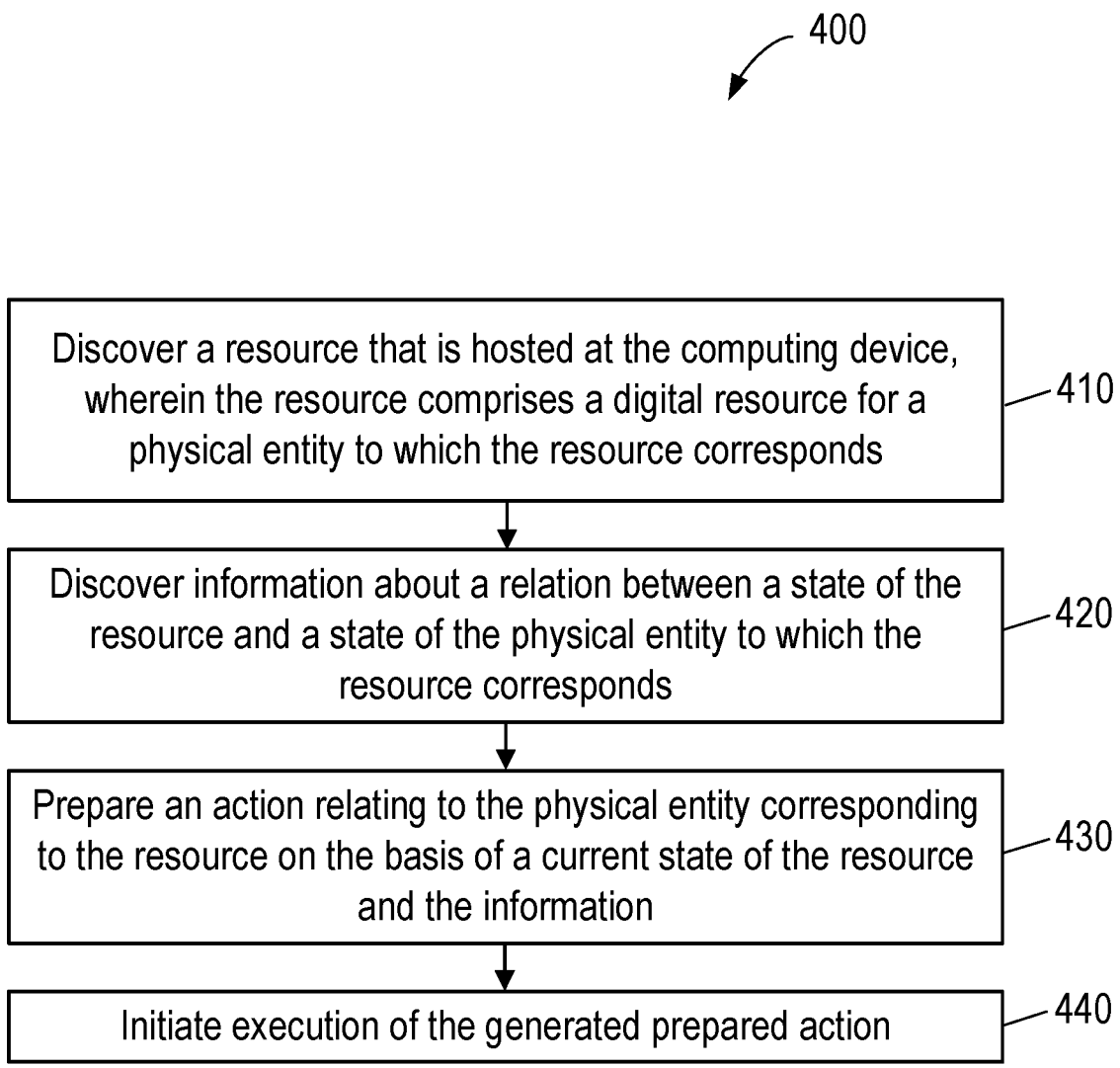
FIG. 4 is a flow chart illustrating process steps in a method performed by a network node.
Figure 5:
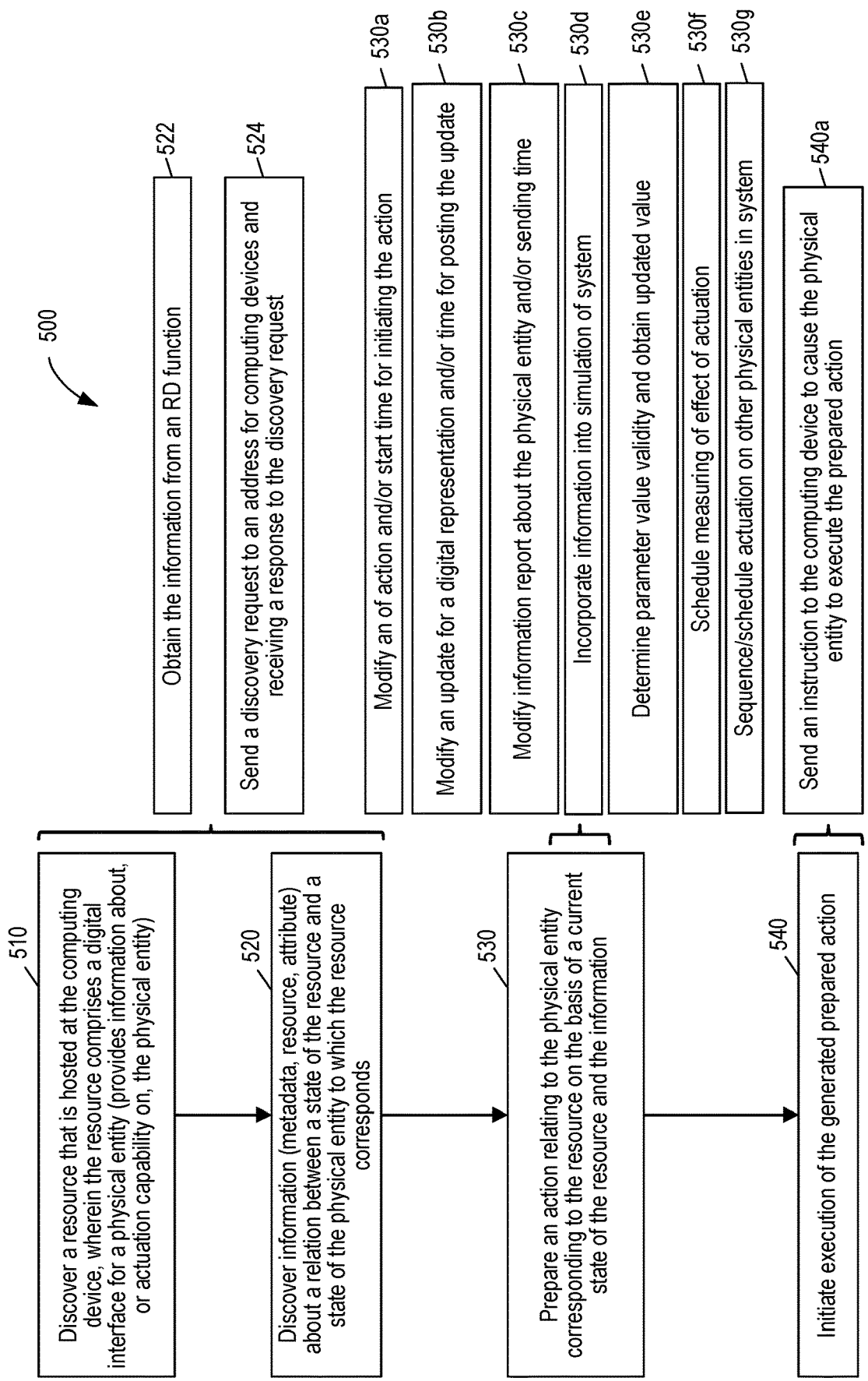
FIG. 5 is a flow chart illustrating process steps in another example of a method performed by a network node.

The methods 100 and 200 of FIGS. 1 and 2 may be complimented by suitable methods performed at one or more network nodes, as illustrated in FIGS. 4 and 5.

FIG. 4 is a flow chart illustrating process steps in a method 400 performed by a network node, which may be a physical node such as a computing device, server etc., or may be a virtual node, which may comprise any logical entity, such as a Virtualised Network Function or application for example running in a cloud, edge cloud or fog deployment. The network node may be operable to run at least one of a CoAP client and/or a LwM2M Management server. Referring to FIG. 4, the method 400 comprises, in a first step 410, discovering a resource that is hosted at the computing device, wherein the resource comprises a digital interface for a physical entity to which the resource corresponds. The method then comprises, in step 420, discovering information about a relation between a state of the resource and a state of the physical entity to which the resource corresponds. In step 430, the method comprises preparing an action relating to the physical entity corresponding to the resource on the basis of a current state of the resource and the information. In step 440, the method comprises initiating execution of the prepared action.

The action may be executed by the physical entity or by the network node, and the step 430 of preparing an action may comprise performing an analysis of the current state of the resource, and/or a simulation based on a current state of the resource, and determining an action as a consequence of the analysis or simulation. The impact of the information may be considered as part of the analysis or simulation, or may be used to update the action after the analysis or simulation, as discussed in further detail below.

FIG. 5 is a flow chart illustrating process steps in a further example of method 500 performed by a network node. As for the method 400 of FIG. 4, the network node may be a physical node such as a computing device, server etc., or may be a virtual node, which may comprise any logical entity, such as a Virtualised Network Function or application for example running in a cloud, edge cloud or fog deployment. The network node may be operable to run at least one of a CoA client and/or a LwM2M Management server.

The steps of the method 500 illustrate one example way in which the steps of the method 400 may be implemented and supplemented in order to achieve the above discussed and additional functionality.

Referring to FIG. 5, according to the method 500, in a first step 510, the network node discovers a resource that is hosted at the computing device, wherein the resource comprises a digital interface for a physical entity to which the resource corresponds. The resource may for example comprise a digital interface that provides information about, or actuation capability on, the physical entity. In some examples, the resource may comprise a software element and/or logical functionality for accessing, processing and storing sensor information and for controlling actuators.

In step 520, the network node discovers information about a relation between a state of the resource and a state of the physical entity to which the resource corresponds. The information may be discovered as any one or more of a metadata resource, a resource attribute, and/or an annotation to the resource. A metadata resource may for example comprise a separate resource that contains only the information, and which is linked in some way to the resource that is the subject of the information.

As illustrated in steps 522 and 524, discovering the resource and the information about a relation between a state of the resource and a state of the physical entity to which the resource corresponds may comprise performing at least one of obtaining the information from a Resource Directory function, or sending a discovery request to an address for computing devices and receiving a response to the discovery request. The response to the discovery request may include both resources exposed by the computing device and the relevant information about a relation between the resource or resources and a state of the physical entity to which the resource or resources correspond.

It will be appreciated that the information discovered by the network node in step 520 may comprise any of the example information illustrated in FIG. 3 and discussed above.

In step 530, the network node prepares an action relating to the physical entity corresponding to the resource on the basis of a current state of the resource and the information. As discussed above, the action may be executed by the physical entity or the network node, and the step of preparing an action may comprise performing an analysis of the current state of the resource, and/or a simulation based on a current state of the resource, and determining an action as a consequence of the analysis or simulation. The impact of the information may be considered as part of the analysis or simulation, or may be used to update the action after the analysis or simulation, as discussed illustrated in steps 530a to 530d.

As illustrated at 530a, the action relating to the physical entity corresponding to the resource may comprise an action to be performed by the physical entity, and preparing the action may comprise modifying, on the basis of the discovered information, at least one of an action or a start time for initiating the action that have been prepared on the basis of a current state of the resource. The start time for initiating the action may for example comprise a time for sending an instruction to the resource to cause the physical entity to execute the action. Different scenarios may be envisaged according to different options for the content of the discovered information. For example, the timing of a valve opening instruction may be adapted to take account of the delay to fully open the valve (act-delay implementation discussed below). In another example an action to reverse a previous instruction may be cancelled if the previous instruction has already had a visible effect (on-off act delay implementation discussed below), or impacted a system outside the device's control (external impact implementation discussed below). In another example, an action based on a derived parameter value may be updated following a sensor measurement check for the parameter value (actuator-reliability implementation discussed below).

As illustrated at 530b, the action relating to the physical entity corresponding to the resource may comprise updating a digital representation of the physical entity that is provided by the network node and preparing the action may comprise modifying, on the basis of the information, at least one of an update for the digital representation or a time for posting the update that have been prepared on the basis of a current state of the resource.

As illustrated at 530c, the action relating to the physical entity corresponding to the resource may comprise reporting information about the physical entity, and preparing the action may comprise modifying, on the basis of the information, at least one of an information report about the physical entity or an time for sending the information report that have been prepared on the basis of entity current state of the resource.

As illustrated at 530d the action relating to the physical entity corresponding to the resource may comprise generating a simulation of a system comprising the physical entity. In such examples, preparing the action may comprise incorporating the information about a relation between a state of the resource and a state of the physical entity to which the resource corresponds into the simulation. For example, the simulation may take account of delays associated with various actuations, physical process etc. that are not instantaneous following updating of a resource to execute the relevant actuation. Considering the example of a simulation of start-up of an airplane, the opening of fuel flow valves, engine start-up, hydraulic pressure build up for control surfaces etc. may all take a non-negligible amount of time from the instant the corresponding resource is updated, instructing the relevant actuation. Incorporating information about a relation between a state of the relevant resources and a state of the physical entities to which the resources correspond can ensure a more accurate simulation. It will be appreciated that the network node may generate the simulation or may supply information to another logical energy to support simulation generation.

As illustrated at 530e, the resource may comprise a digital interface that provides actuation capability on the physical entity, and the action relating to the physical entity corresponding to the resource may comprise deriving a value for a parameter representing a system impacted by execution of the actuation capability using a state of the resource. In such examples, preparing the action may comprise determining, on the basis of the information, whether or not a value for the parameter derived on the basis of a current state of the resource is valid, and obtaining an updated value for the parameter if a value derived on the basis of a current state of the resource is determined to be invalid. Different options may be envisaged for determining validity, as well as for updating, according for example to the nature of the information discovered. In one option, a validity check may be performed first, for example via a timer check to determine whether a value based on resource state will be valid or should be confirmed via a sensor reading. In another option, a value may first be derived and then its validity checked, for example by determining whether or not the derived value is within a valid range. Options for updating include updating a model or algorithm used to derive the value, updating inputs to a model to account for delay in actuation execution, updating timing at which derived value is considered correct, checking a sensor reading etc.

As illustrated at 530f, the resource may comprise a digital interface that provides actuation capability on the physical entity, and the action relating to the physical entity corresponding to the resource may comprise measuring an effect of execution of the actuation capability. In such examples, preparing the action may comprise scheduling a time for measuring an effect of execution of the actuation capability on the basis of the information. Scheduling the measuring of actuation effect to take account of an actuation delay may ensure a more accurate confirmation of actuation execution, and consequently more reliable error detection. Considering the example of a valve and associated pressure sensor, immediately after the resource corresponding to the valve is updated to execute opening of the valve, the pressure sensor adjacent the valve will not read a significant change in pressure. However, once the valve has had time to open fully, full fluid flow through the valve should be established, and a change in pressure should be observed at the sensor. If the pressure sensor has still not registered a change in pressure after the complete opening time has elapsed, there may be an error or fault. By taking account of the information about delay between changing resource state (switching the valve resource to open) and that changed state being manifested at the valve (the valve actually transitioning to fully open), examples of the present disclosure can support a more accurate error detection. For example, the network node can implement an algorithm in which it opens the valve, monitors the associated pressure, and, only after the valve movement time has elapsed, declares an error condition if the sensor is not registering a pressure change.

As illustrated at 530*g*, the physical entity may be a component entity of a system comprising a plurality of physical entities, and the action relating to the physical entity corresponding to the resource may comprise execution of an actuation capability on at least one other physical entity within the system. In such examples, preparing the action may comprise preparing at least one of a sequencing or a scheduling of the execution of the actuation capability on at the least one other physical entity within the system on the basis of the information. Thus for example, multiple separate actuations may be programmed on the basis of the information provided, allowing for accurate coordination of cooperating physical entities. In one example, a paint system may comprise physical entities including actuators for controlling position, orientation and flow rate of paint spray nozzles, as well as paint supply flow control valves to control the supply of paint to the spray nozzles. In such a system, a network node could schedule the instructions to open a paint supply flow control valve, correctly position and orient the desired spray nozzles, and start spraying from the nozzles, so as to take account of the various delays in valve opening, nozzle positioning etc. In this manner, a more precise control of the system is achieved.

In step 540, the network node initiates execution of the prepared action. As illustrated at 540*a*, for an action to be performed by the physical entity initiating execution of the prepared action may comprise sending an instruction to the computing device to cause the physical entity to execute the prepared action.

In further examples of the present disclosure, the information discovered by the network node may be provided by a proxy server. Such a proxy server may comprise processing circuitry that is configured to receive a discovery request relating to a resource that is hosted at a computing device, wherein the resource comprises a digital interface that corresponds to a physical entity, and to forward the discovery request to at least one of a resource directory or the computing device. The proxy server may be further configured to receive a response to the discovery request, to add to the response information about a relation between a state of the resource and a state of the physical entity to which the resource corresponds, and to forward the response to its destination address.

There now follows a discussion of examples illustrating how the methods 100 to 500 may be implemented in LwM2M, CoAP and OCF data models.

Considering initially LwM2M, example methods of the present disclosure may be implemented by extending the LwM2M object model with annotations in descriptions of resources, resource attributes, or linked resources that provide additional information for tracking how changes in the given resource impact the physical world. A LwM2M object model describes the resources that can be observed and/or modified by an LwM2M application. Objects enhanced according to examples of the present disclosure may contain any one or more of the following examples of additional information for any one or more of the applicable resources.

Real-World Effect Delays

The information may reflect a time taken for a change in a resource value to be reflected in physical world. For example, a delay may indicate the time that will be taken for a light to turn visibly on, or for a valve to open after the relevant command has been issued. For long state changes, this can be further split to "initial impact" and "full impact", i.e., when the first changes are reflected and when the full change is reflected. In one example, two new LwM2M resource attributes (see section 5.1 in the Lightweight Machine to Machine Technical Specification: Core, Approved Version: 1.1.1-2019 06 17, Open Mobile Alliance) may be defined:
"act-delay" with value in milliseconds indicating the time after which initial changes are reflected in the physical world (detectable by a human observer, instrument etc.)
"act-full-delay" with value in milliseconds indicating the time after which the full change is reflected.

Reversal Semantics

The information may indicate the impact of changing a resource to a value and then reversing the change within a particular time period. For example, if a light is turned on and back off within a few milliseconds, the change is not visible to a human observer. Also, an "engine on" event may not have a physical impact for some time as the engine start procedure may not be completed before a new command is received that turns the engine off. The length of the relevant time period will be specific to a particular application and/or resource, and may be communicated as part of the information, and it will be appreciated that the reversal information may be considered as a special case of the delay information discussed above. In one example, a new LwM2M resource attribute may be defined:
"on-off-act-delay" with value in milliseconds indicating the time after which an "off" action will have visible impact if an "on" action has been executed. The opposite effect can be described with a new "off-on-act-delay" attribute.

Degree of Control

The information may indicate to what extent the resource value is related to physical properties outside of the control of the network node (which may for example be running a Digital Twin process). For resource values whose impact is fully controlled by the network node, the impact can be fully controlled and accurately analysed. However, if properties outside the control of the network node are impacted by the state of the resource, this analysis may not be possible and the impact of, for example, delaying an action or changing the order of actions, may not be possible to control or to predict. An example of this situation is an actuator in the form of an igniter that may start a chemical process (such as a fire) that continues on its own, outside the control of the actuator. In one example, a new LwM2M resource attribute may be defined: "external-impact" with Boolean value indicating if resource value has an impact on a system or process that is outside the control of the resource and/or the network node.

Actuator Reliability

The information may indicate which parameter values relating to a resource may be estimated on the basis of the resource state, and which values should be verified using a sensor. For example, the flow associated with a valve can be estimated based on valve state if the pipe pressures are expected to be reliably similar in different situations. However, if pipe pressures cannot be reliably predicted, then flow estimates may be incorrect. Similarly, a thermostat may be set to a particular temperature value, with the expectation that the temperature in the environment controlled by the thermostat will gradually change to match the set temperature. However, externa conditions, outside temperature, window and door positions etc. can all impact the rate at which temperature changes. In one example, a new LwM2M resource attribute may be defined:
"actuator-reliability" with either (a) a numeric value indicating how much time should at most pass between verification of estimated parameter values using sensor readings, and/or (b) a range of values or offsets that are expected, or deemed safe "safe" (for example, for a thermostat temperature values between 20-25 degrees Celsius may be deemed safe, or values deviating by less than 5% from the last measured sensor reading.

Protocol Details

LwM2M

Examples of the information to be exposed by a computing device are discussed above, and presented as additional attributes attached to existing LwM2M objects. An alternative implementation would be to use new resources that are linked to the existing resources via new schema extensions or via a completely new protocol mechanism for indicating metadata about resources. LwM2M could use the extensions in two ways: registration of information and discovery of information.

A LwM2M client may use the standard LwM2M "Register" operation to indicate to a server what kind of capabilities (Objects) it has using the CoRE link format. The objects may be annotated with link-attributes. Using the extension described in the present disclosure, the object links can contain annotations about real-world impacts of the objects. For instance, an annotation could indicate an on-off actuator delay of 10 seconds for a device/object "3303" using the annotation:

"<3303>;on-off-act-delay=10"

Such an annotation may apply to the full object or to specific resources in the device/object. For instance, resource-level information, such as:

"<3303/5650>;on-off-act-delay=10"

could be provided for the specific resource "3303/5650".

The LwM2M server may use the standard LwM2M "Discover" operation to discover the values of the new attributes. For example, a Discover operation on object 3203 (Analog output), where the resource 5650 is the "Analog Output Current Value" and 5750 "Application Type", could return response (using the standard CoRE link format):

<3303/5650>;on-off-act-delay=10,<3303/5750>

This indicates that if the current value is zero, a non-zero value is written, and the previous write is followed by write of zero within 10 milliseconds, the first write operation can be cancelled. Otherwise both operations need to be executed, even if the first operation had not been executed before receiving the second operation.

For legacy LwM2M devices that are not able to indicate this metadata for discovery operations, two approaches are possible. In one approach, the application proceeds without the metadata information, and makes, for example, a conservative estimate of actuator delays. Alternatively, a LwM2M proxy could be implemented that enhances the discovery response messages with the metadata, as discussed above.

In another example implementation, specific objects could include the information proposed in the present disclosure as separate resources, as discussed above with reference to FIGS. 1 to 5. For example, a new version of the standard Analog Output object could have an additional resource that hosts the CoRE link format description shown in the examples above.

It is proposed that attribute names and representation formats for the values of the attributes may be standardised in OMA SpecWorks for LwM2M protocol use. Alternatively, the protocol or schema extensions to support alternative ways to indicate this metadata could be standardised or new data models or model versions could include a new resource or resources that hosts this information.

Plain CoRE (CoAP) Resource Directory

The LwM2M registration interface is a subset of the CoRE Resource Directory (RD), and hence the same approach of link attributes discussed above applies to any implementation of the CoRE RD. With RD, the links are not restricted to contain Object IDs but any URL is valid. For example, a RD client could register an analog input device with the following link:

</sensors/my-analog-input>;on-off-act-delay=10

Currently there is no general registry for CoRE link attributes, the establishment of such a registry is under discussion at the IETF. If a registry is established, the extensions discussed in the present disclosure could be registered.

Open Connectivity Foundation (OCF)

The OCF uses CoAP as the transfer protocol, and so the present disclosure can be implemented in OCF in a similar manner to CoAP. The OCF's data models are specific to OCF, and definition and registration of some new attributes for OCF may be appropriate if the functionality described above is to be used in OCF systems.

Figure 6:
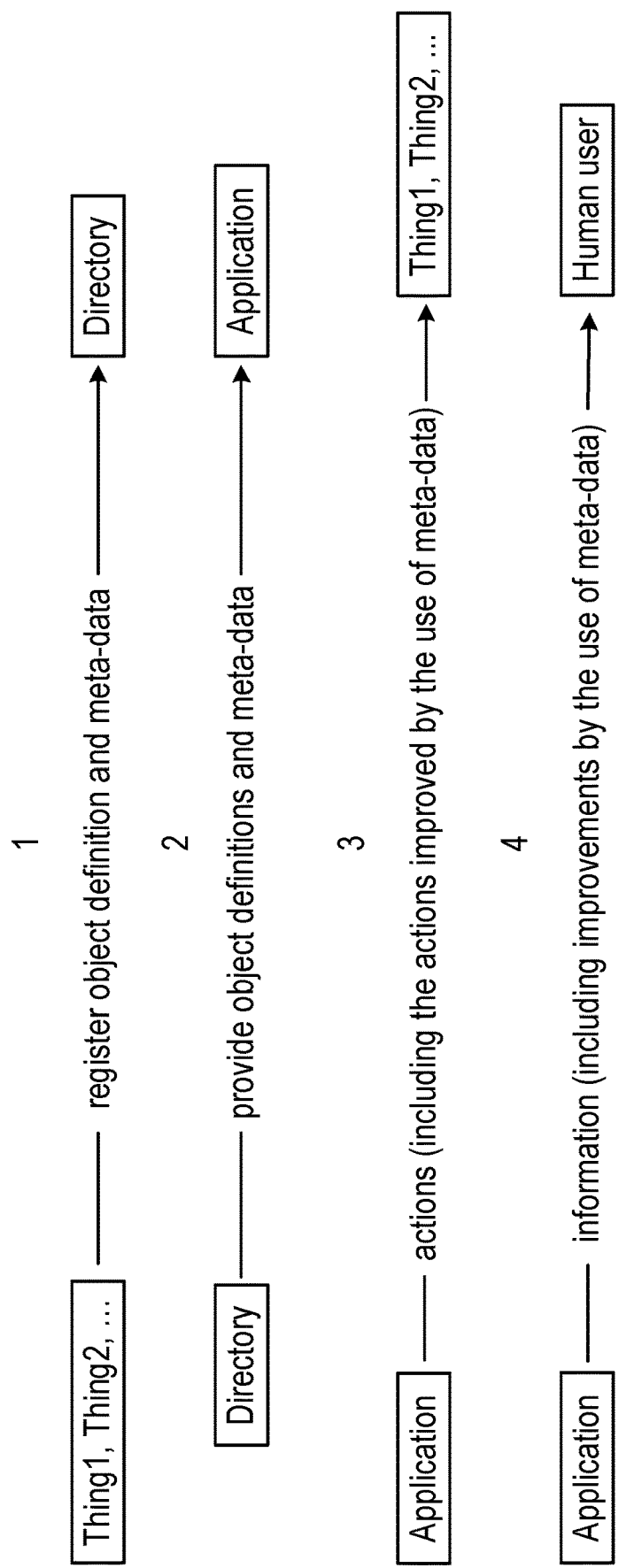
FIG. 6 illustrates an example information exchange according to an implementation of the methods of FIGS. 1, 2, 4 and 5.

FIG. 6 illustrates an example information exchange according to one implementation of the methods disclosed herein. Referring to FIG. 6, one or more "Things", which comprise computing devices, register object definitions, including one or more resources, and meta-data comprising the information proposed in the present disclosure, with a Resource Directory (Step 1). The Resource Directory may be a part of the computer system(s) controlling an overall IoT system. Directory then makes its information available to Applications, including for example Digital Twin applications (Step 2). The Applications can then use the information proposed in the present disclosure to prepare actions (Step 3) and/or to prepare information for a human user Step 4). The information may be used in simulations run by the application, to manage timing, initiation or selection of actions, etc.

Figure 7:
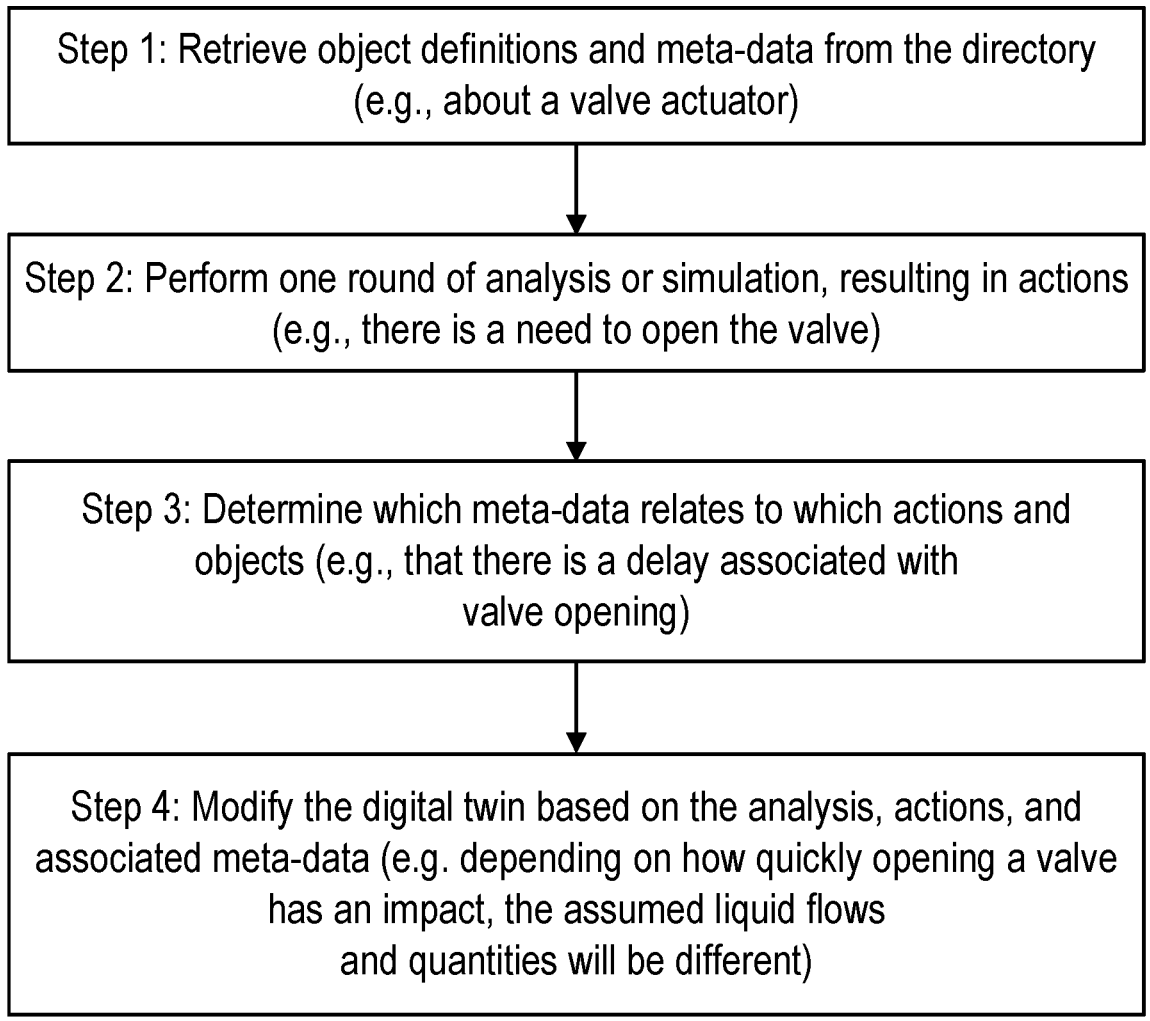
FIG. 7 is a flow chart of example actions for an application, such as may be running on a network node.

FIG. 7 is a flow chart of example actions for an application, such as may be running on a network node. Referring to FIG. 7, the application retrieves object definitions and meta-data from the directory in Step 1, for example about a valve actuator. In step 2, the application performs one round of analysis or simulation, resulting in actions, such as an action to open the valve. In Step 3, the application determines which meta-data relates to which actions and objects, for example determining that there is a delay associated with valve opening. In Step 4, the application modifies its parameters, actions or information presented based on the analysis, actions, and associated meta-data. For example, estimated liquid flows and quantities may be updated to reflect how quickly the valve becomes fully open.

Figure 8:
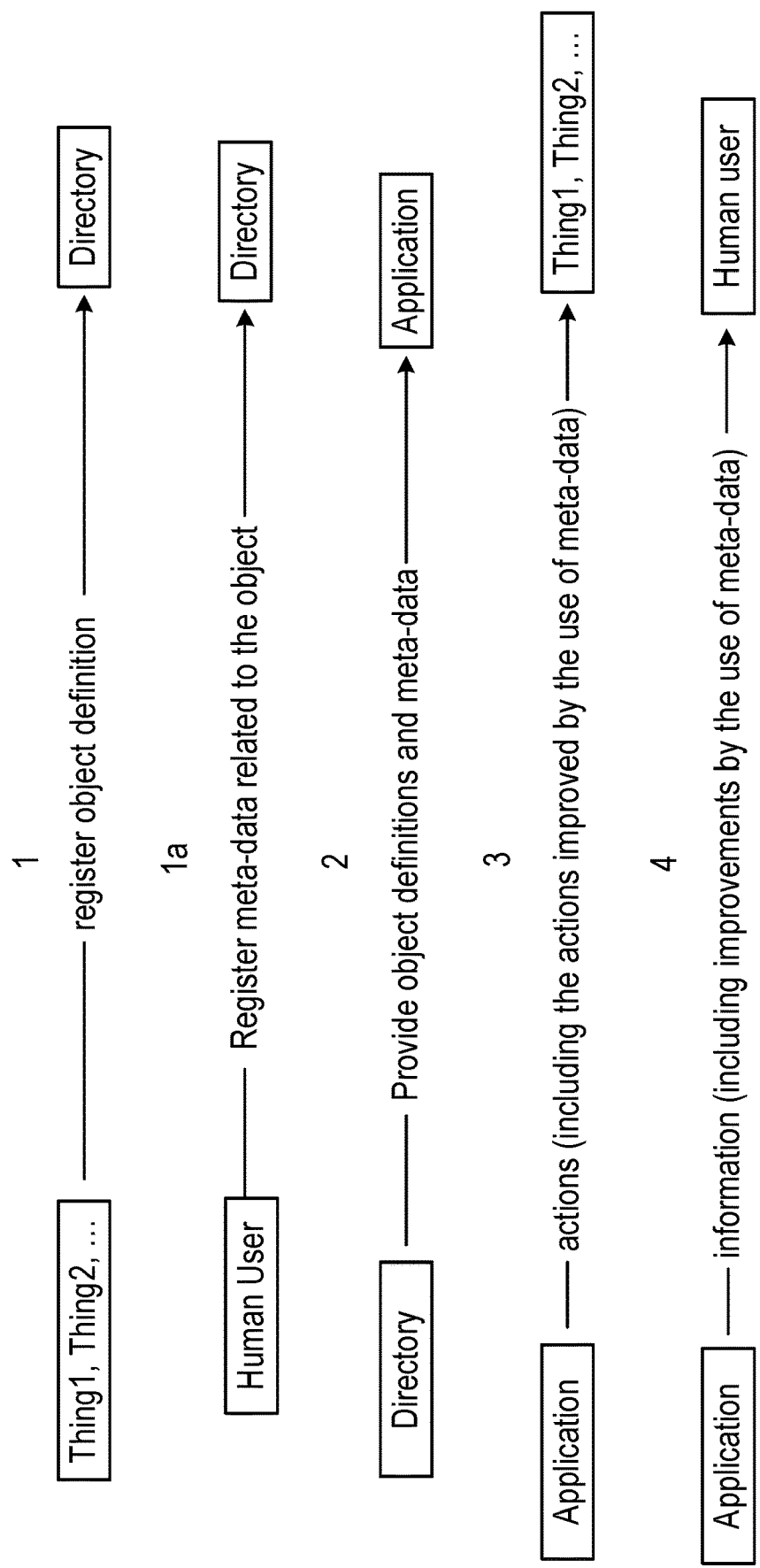
FIG. 8 illustrates an alternative information exchange according to another implementation of the methods of FIGS. 1, 2, 4 and 5.

FIG. 8 illustrates an alternative information exchange according to another implementation of the methods disclosed herein, in which the meta-data is provided by a third party such as a system administrator, or separate management system. This is illustrated as a human user in FIG. 8. It will be appreciated that steps 2, 3 and 4 of FIG. 8 are substantially the same as the equivalent steps in FIG. 6. However, in FIG. 8, object definitions are registered by the computing devices in step 1*a*, and meta-data is registered by a human user in step 1*a*. The use of the meta-data by the application may still follow the flow of FIG. 7.

As discussed above, the methods 100, 200, 400 and 500 are performed by a computing device and network node respectively. The present disclosure provides a computing device and a network node which are adapted to perform any or all of the steps of the above discussed methods. The computing device and network node may comprise CoAP endpoints and may comprise constrained devices and/or logical or other functions.

Figure 9:
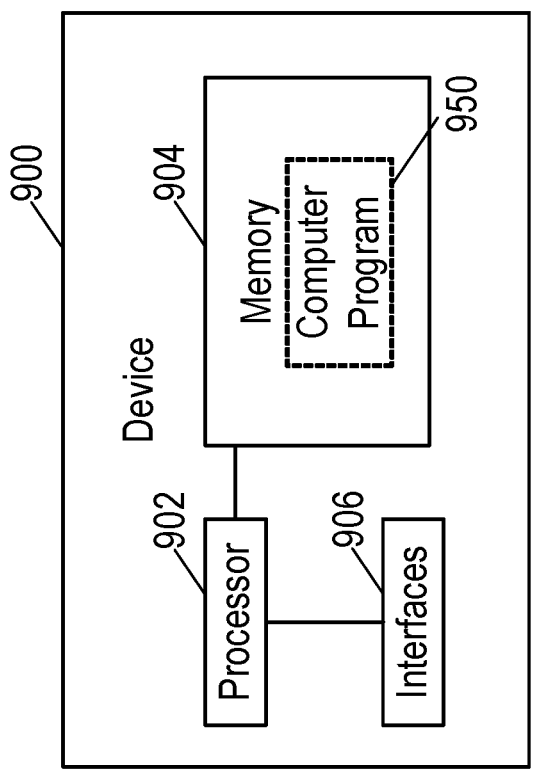
FIG. 9 is a block diagram illustrating functional modules in a computing device.

FIG. 9 is a block diagram illustrating a computing device 900 which may implement the method 100 and/or 200 according to examples of the present disclosure, for example on receipt of suitable instructions from a computer program 950. Referring to FIG. 9, the computing device 900 comprises a processor or processing circuitry 902, and may comprise a memory 904 and interfaces 906. The processing circuitry 902 is operable to perform some or all of the steps of the method 100 and/or 200 as discussed above with reference to FIGS. 1 and 2. The memory 904 may contain instructions executable by the processing circuitry 902 such that the computing device 900 is operable to perform some or all of the steps of the method 100 and/or 200. The instructions may also include instructions for executing one or more telecommunications and/or data communications protocols. The instructions may be stored in the form of the computer program 950. The interfaces 906 may comprise one or more interface circuits supporting wired or wireless communications according to one or more communication protocols. The interfaces 906 may support exchange of messages in accordance with examples of the methods disclosed herein. In one example, the interfaces 906 may comprise a CoAP interface towards a Resource Directory function and other CoAP interfaces towards network nodes in the form of CoAP endpoints.

Figure 10:
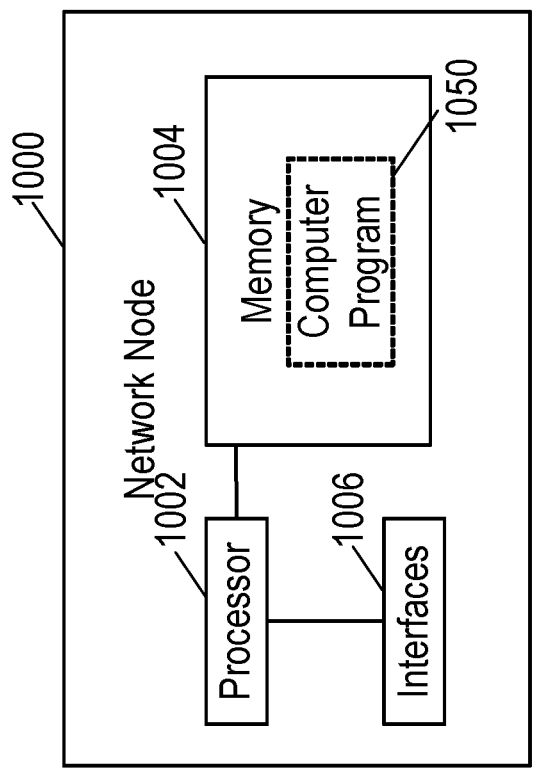
FIG. 10 is a block diagram illustrating functional modules in a network node.

FIG. 10 is a block diagram illustrating a network node 1000 which may implement the method 400 and/or 500 according to examples of the present disclosure, for example on receipt of suitable instructions from a computer program 1050. Referring to FIG. 10, the network node 1000 comprises a processor or processing circuitry 1002, and may comprise a memory 1004 and interfaces 1006. The processing circuitry 1002 is operable to perform some or all of the steps of the method 400 and/or 500 as discussed above with reference to FIGS. 4 and 5. The memory 1004 may contain instructions executable by the processing circuitry 1002 such that the network node 1000 is operable to perform some or all of the steps of the method 400 and/or 500. The instructions may also include instructions for executing one or more telecommunications and/or data communications protocols. The instructions may be stored in the form of the computer program 1050. The interfaces 1006 may comprise one or more interface circuits supporting wired or wireless communications according to one or more communication protocols. The interfaces 1006 may support exchange of messages in accordance with examples of the methods disclosed herein. In one example, the interfaces 1006 may comprise a CoAP interface towards a Resource Directory function, and may further comprise one or more CoAP interfaces towards computing devices in the form of CoAP endpoints.

In some examples, the processor or processing circuitry 902, 1002 described above may include one or more microprocessors or microcontrollers, as well as other digital hardware, which may include digital signal processors (DSPs), special-purpose digital logic, etc. The processor or processing circuitry 902, 1002 may be implemented by any type of integrated circuit, such as an Application Specific Integrated Circuit (ASIC), Field Programmable Gate Array (FPGA) etc. The memory 904, 1004 may include one or several types of memory suitable for the processor, such as read-only memory (ROM), random-access memory, cache memory, flash memory devices, optical storage devices, solid state disk, hard disk drive etc.

Examples of the present disclosure may be implemented in a system of devices, or "Things", controlled by a computer that models the things and the entire system through a set of Digital Twins. The Things controlled by the computer are represented as objects or resources, and the Things are typically self-describing by registering the definitions of their associated objects in the computer system. In accordance with examples of the present disclosure, the Things may provide additional information in their object definitions, through meta-data annotations, link attributes, additional resources, etc., and the computer system may interpret those annotations in a way that improves the accuracy of the Digital Twin representation. For instance, the addition of an "act-delay" attribute to an object representing a valve helps the computer system model the closing and opening of the valve in a more accurate manner than simply assuming an actuator command has taken immediate effect. It will be appreciated that throughout the present disclosure, the reference to valves, thermostats, temperature sensors etc. are merely for illustration, and a wide range of specific use cases relating to individual actuators, sensors and other computing devices may be envisaged.

According to examples of the present discourse, the information regarding physical entity impact or relation is provided by computing device itself, for example as part of its object (capability) description. The device can provide this information as its manufacturer knows the characteristics of the device (valve opening speeds, temperature sensor response time etc.) This provision of the information by the device avoids the expense and difficulty of programming an IoT application with information for all possible different types of device. Advantageously, existing registration processes for IoT registry and directory systems may be used, as opposed to coding the location of a manufacturer's central database in all IoT applications. In addition, the information about physical world impacts of digital resources is obtained together with other data about a computing device, rather than having to be fetched from multiple locations. The information, once obtained, can be used to improve instructions to the device, the timing of such instructions, the representation of data to a human user or other system, simulations and analysis performed in relation to the computing device or related systems, etc.

This learning of information about real world impacts by application running on a network node is both automatic and dynamic, and information about specific sensor and actuator types does not need to be pre-programmed into the applications. Consequently, examples of the present disclosure allow for improved use of LwM2M, CoAP or OCF for Digital Twin systems, as the digital twins can accurately model the current state of the physical system, including modelling the lag of communication and sensor/actuator delays. This enables an application using Digital Twins to make better or more optimal decisions. For instance, an action may be scheduled to take place, but an opposite action may become appropriate before the first action has been executed. Examples of the present disclosure enable an application to identify such cases, in which any change to the physical system may be minimised and the original action can be internally cancelled.

Examples of the present disclosure may be particularly applicable for use in Industry 4.0 and similar systems, in which many heterogeneous types of devices are involved, and consequently configuring information about device capabilities in a proxy or application would not scale. Discovering this information from the devices directly offers a practical alternative to such intensive programming.

Examples of the present disclosure are also incrementally deployable on top of existing IoT systems, protocols, and object models. As an annotation, information can be added without causing interoperability problems with equipment that does not yet support the use of the specific annotations. Similarly, sensors/actuators that do not yet provide the annotations can still be treated in the usual fashion.

It will be appreciated that examples of the present disclosure may be virtualised, such that the methods and processes described herein may be run in a cloud environment.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

It should be noted that the above-mentioned examples illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method performed by a computing device, the method comprising:
   exposing a resource that is hosted at the computing device, wherein the resource comprises a digital interface for a physical entity to which the resource corresponds and wherein the resource specifies a particular view or active property of an object, and each resource is at least one of readable, writable, and executable;
   exposing information about a relation between a state of the resource and a state of the physical entity to which the resource corresponds, wherein the information about the relation between the state of the resource and the state of the physical entity to which the resource corresponds comprises a time required for the physical entity to undergo a change of state, and wherein the information conveys at least one of:
      a delay between a change of the state of the resource and a change of the state of the physical entity to which it corresponds, and
      a delay between a change of the state of the physical entity and a change in the state of the corresponding resource, and
   based on the information conveying at least one of the delay between at least one of the change of the state of the resource and the change of the state of the physical entity to which it corresponds and the delay between the change of the state of the physical entity and the change in the state of the corresponding resource, modifying a start time for initiating an action to be performed by the physical entity.

2. A computing device comprising processing circuitry that is configured to:
   expose a resource that is hosted at the computing device, wherein the resource comprises a digital interface for a physical entity to which the resource corresponds and wherein the resource specifies a particular view or active property of an object, and each resource is at least one of readable, writable, and executable;
   expose information about a relation between a state of the resource and a state of the physical entity to which the resource corresponds, wherein the information about the relation between the state of the resource and the state of the physical entity to which the resource corresponds comprises a time required for the physical entity to undergo a change of state, and wherein the information conveys at least one of:
      a delay between a change of the state of the resource and a change of the state of the physical entity to which it corresponds, and
      a delay between a change of the state of the physical entity and a change in the state of the corresponding resource, and
   based on the information conveying at least one of the delay between at least one of the change of the state of the resource and the change of the state of the physical entity to which it corresponds and the delay between the change of the state of the physical entity and the change in the state of the corresponding resource, modify a start time for initiating an action to be performed by the physical entity.

3. A computing device as claimed in claim 2, wherein the digital interface provides information about, or actuation capability on, the physical entity.

4. A computing device as claimed in claim 2, wherein the processing circuitry is further configured to:
   receive an instruction relating to the exposed resource; and
   process the instruction.

5. A computing device as claimed in claim 2, wherein the processing circuitry is further configured to expose the information about the relation between the state of the resource and the state of the physical entity to which the resource corresponds by performing at least one of:
   registering the information with a Resource Directory function; or
   responding to a discovery request.

6. A computing device as claimed in claim 2, wherein the digital interface provides information about the physical entity, and wherein the information about the relation between the state of the resource and the state of the physical entity to which the resource corresponds comprises a delay between a change in state being manifested by the physical entity and that change in state of the physical entity being reflected by a change in state of the resource.

7. A computing device of claim 2, wherein the digital interface provides information about actuation capability on the physical entity, and wherein the information about the relation between the state of the resource and the state of the physical entity to which the resource corresponds comprises an indication of whether execution of the actuation capability on the physical entity impacts a physical entity or system which is outside the control of the computing device.

8. A computing device of claim 2, wherein the digital interface provides information about actuation capability on the physical entity, and wherein the information about the relation between the state of the resource and the state of the physical entity to which the resource corresponds comprises a condition under which a state of the resource may be used to derive a value for a parameter representing a system impacted by execution of the actuation capability on the physical entity.

9. A computing device of claim 2, wherein the information the relation between the state of the resource and the state of the physical entity to which the resource corresponds comprises a sleep cycle specification for the computing device.

10. A computing device of claim 2, wherein the processing circuitry is further configured to expose the information about the relation between the state of the resource and the state of the physical entity to which the resource corresponds as at least one of:
   a metadata resource;
   a resource attribute; and
   an annotation to the resource.

11. A computing device of claim 2, wherein the computing device is operable to run at least one of:
   a Constrained Application Protocol server; and
   a Lightweight Machine to Machine client.

* * * * *